United States Patent
Yang et al.

(10) Patent No.: US 12,496,587 B2
(45) Date of Patent: Dec. 16, 2025

(54) SOLAR PANEL RECYCLING SYSTEM AND THE RECYCLING METHOD THEREOF

(71) Applicant: Jiin Yeeh Ding Enterprise Corp., Hsinchu (TW)

(72) Inventors: Chien-Hung Yang, Hsinchu (TW); Wei-Cheng Chiu, Hsinchu (TW)

(73) Assignee: JIIN YEEH DING ENTERPRISE CORP., Hsinchu (TW)

(*) Notice: Subject to any disclaimer, the term of this patent is extended or adjusted under 35 U.S.C. 154(b) by 46 days.

(21) Appl. No.: 18/410,383

(22) Filed: Jan. 11, 2024

(65) Prior Publication Data
US 2024/0375117 A1    Nov. 14, 2024

(30) Foreign Application Priority Data
May 12, 2023  (TW) ................................. 112117765

(51) Int. Cl.
*B02C 17/18* (2006.01)
*B09B 3/00* (2022.01)
*B65B 1/00* (2006.01)
*B65B 35/44* (2006.01)

(52) U.S. Cl.
CPC ............ *B02C 17/1835* (2013.01); *B65B 1/00* (2013.01); *B65B 35/44* (2013.01)

(58) Field of Classification Search
CPC .......... B02C 17/18; B02C 17/183; B09B 3/35
USPC ....................................................... 53/121
See application file for complete search history.

(56) References Cited

U.S. PATENT DOCUMENTS

| | | | |
|---|---|---|---|
| 3,996,452 A * | 12/1976 | Schulze | B02C 25/00 |
| | | | 241/34 |
| 10,688,535 B1* | 6/2020 | Khadilkar | H10F 19/80 |
| 12,107,529 B2* | 10/2024 | Lee | H02S 99/00 |
| 12,138,898 B2* | 11/2024 | Sakai | H10F 19/80 |
| 2022/0194842 A1* | 6/2022 | Lee | B09B 3/50 |
| 2023/0231214 A1* | 7/2023 | Oh | C22B 7/005 |
| | | | 241/24.14 |
| 2023/0257207 A1* | 8/2023 | Hsiao | B65G 35/06 |
| | | | 198/345.3 |
| 2024/0165634 A1* | 5/2024 | Nagatani | G06N 3/09 |

FOREIGN PATENT DOCUMENTS

CN    111790723 A  * 10/2020  ............... B09B 3/00

* cited by examiner

*Primary Examiner* — Joshua G Kotis
*Assistant Examiner* — Patrick B Fry
(74) *Attorney, Agent, or Firm* — MUNCY, GEISSLER, OLDS & LOWE, P.C.

(57) ABSTRACT

The present invention provides a solar panel recycling system includes: a frame dismantling machine for disassembling the outer frame of a solar panel; a crushing machine for placing the solar panel without the outer frame on the conveyor belt of the crushing machine, wherein the crushing machine includes a sensing unit for sensing the thickness of the glass on the solar panel; and a control unit for controlling the speed of the conveyor belt based on the thickness of the glass and simultaneously controlling the crushing unit to crush the glass on the solar panel, so as to achieve the effect of the separation between the glass and the solar cell module.

9 Claims, 3 Drawing Sheets

SOLAR PANEL RECYCLING SYSTEM AND THE RECYCLING METHOD THEREOF

CROSS-REFERENCE TO RELATED APPLICATIONS

This application claims the benefit of TW 112117765, filed May 12, 2023, which is incorporated in its entirety by reference herein.

FIELD OF THE INVENTION

The present invention relates to a recycling system, particularly relates to a solar panel recycling system and the recycling method thereof.

BACKGROUND OF THE INVENTION

Solar energy technology is currently the most popular green energy technology. Solar panels are generally used to absorb solar radiation and convert it into electrical energy. The average lifespan of current solar panels is approximately 20 years, and the power generation efficiency of a solar panel over 20 years may be difficult to meet the demand. The raw materials for manufacturing solar panels contain a large amount of metal resources such as copper, aluminum, and silver. Therefore, proper disposal of discarded solar panels has become a main objective for manufacturers.

The concept of "Urban Mine" was advocated in the 1980s by Professor Hideo Nanjyo of the Research Institute of Mineral Dressing and Metallurgy at Tohoku University. It promotes the idea of viewing discarded waste electronic products in modern society as "mines" and excavating these massive "mines". Various recycling methods are used to recover precious metals from these "mines". Compared with precious metals extracted, smelted, and processed from the natural environment, precious metals obtained from the "Urban Mine" have less environmental impact and greater economic value.

Most current solar panel recycling methods use heat to reduce the adhesion between a surface glass of a solar panel and a solar cell module, and then remove the surface glass. Using these methods to recycle solar panels consumes a large amount of thermal energy and easily causes environmental pollution; therefore, it is an extremely important issue today to recycle solar panels using low energy consumption methods.

SUMMARY OF THE INVENTION

In view of energy consumption of current solar panel recycling technology, the main object of the present invention is to regulate a conveying speed of a conveyor belt of a crushing machine by measuring a thickness of a glass of a solar panel. When the thickness of the glass of the solar panel is greater than a default value, a control unit slows down the conveying speed of the conveyor belt on which the solar panel is placed; that is, the time of the solar panel staying on the conveyor belt is increased, and the time for crushing the glass of the solar panel in a crushing unit is also increased. When the thickness of the glass of the solar panel is less than the default value, the control unit accelerates the conveying speed of the conveyor belt on which the solar panel is placed; that is, the time of the solar panel staying on the conveyor belt is reduced, and the time for crushing the glass of the solar panel in the crushing unit is also reduced. Accordingly, the conveyor speed of the conveyor belt on which the solar panel is placed is dynamically regulated according to the thickness of the glass of the solar panel, and the processing time of the crushing machine for the glass of the solar panel can be improved.

Another object of the present invention is to use a separating unit to separate the crushed glass of the solar panel from the crushing unit and the solar cell module, so the crushed glass can be further used in various recycling procedures, such as re-manufacturing of glass, soundproof bricks, refractory bricks, and asphalt replacement materials, etc. The separated solar cell modules can be extracted and refined for precious metals. That is, they are transformed to urban minerals indirectly.

According to the above object, the present invention discloses a solar panel recycling system includes: a frame dismantling machine for removing an outer frame of a solar panel; and a crushing machine, wherein the solar panel without the outer frame is placed on a conveyor belt of the crushing machine that includes at least a sensing unit for measuring a thickness of a glass of the solar panel, and a control unit for simultaneously regulating a conveying speed of the conveyor belt according to the thickness of the glass and controlling a crushing unit in which the glass of the solar panel is crushed.

According to the above object, the present invention also discloses a solar panel recycling method comprising: conducting a frame dismantling step for removing an outer frame of a solar panel; placing the solar panel without the outer frame on a conveyor belt of a crushing machine; measuring a thickness of a glass of the solar panel on the conveyor belt; regulating a conveying speed of the conveyor belt according to the thickness of the glass, when the thickness of the glass is greater than a default value, slowing down the conveying speed of the conveyor belt, and when the thickness of the glass is less than the default value, accelerating the conveying speed of the conveyor belt; and conducting a crushing step for simultaneously regulating the conveying speed of the conveyor belt according to the thickness of the glass and crushing the glass of the solar panel.

DETAILED DESCRIPTION OF THE PREFERRED EMBODIMENT

Detailed descriptions of embodiments of the present invention are given below; however, the scope of the present invention is not limited by the embodiments described herein. The figures herein are all schematic representations and are mainly used to show the connection between units. The embodiments are described in detail below with reference to the accompany figures.

Figure 1:
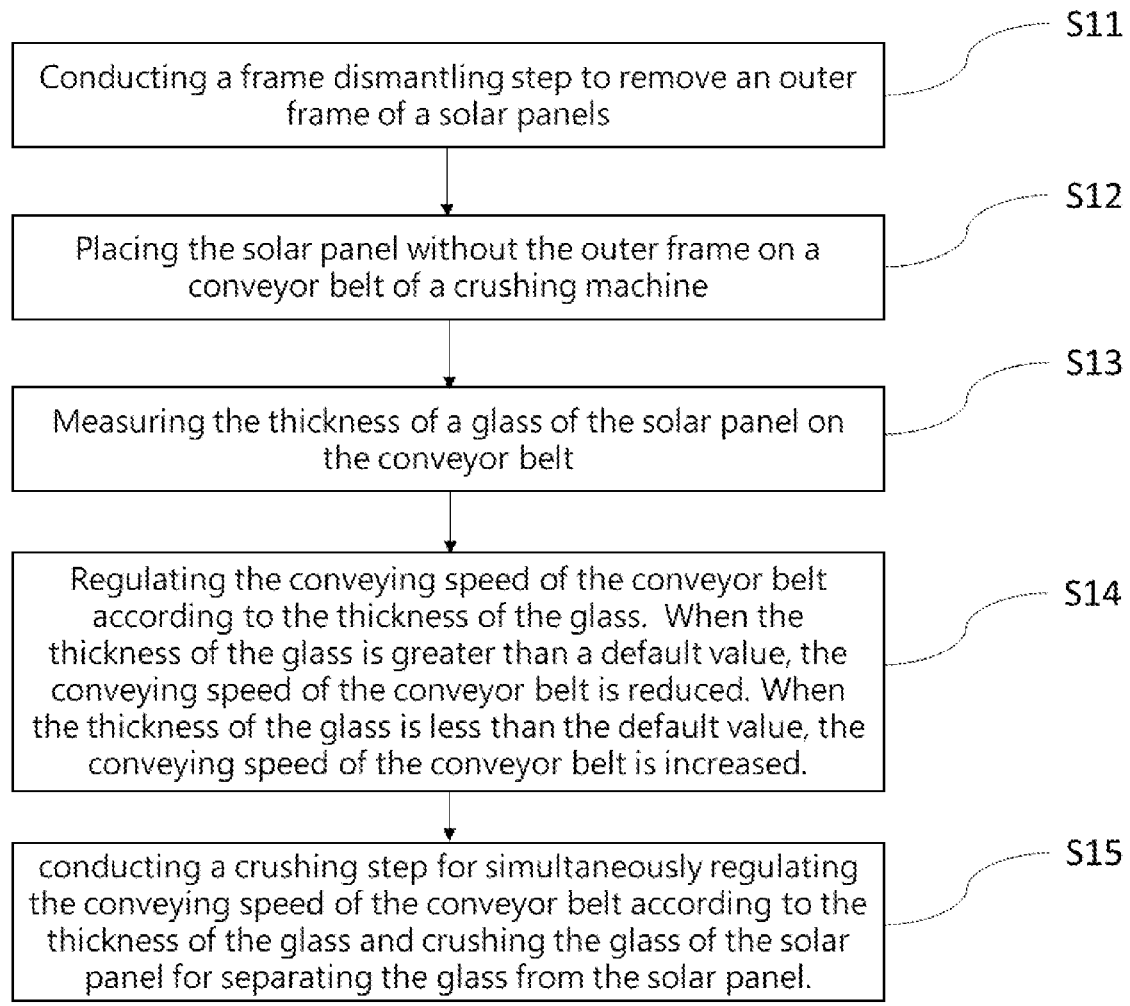
FIG. 1 is a flow chart illustrating an embodiment of a solar panel recycling method according to the technology disclosed present invention.

First, please refer to FIG. 1, a schematic flow chart of the steps of the solar panel recycling method disclosed in the present invention. As shown in FIG. 1, step S11 is conducting a frame dismantling step to remove an outer frame of a solar panel. In step S12, the solar panel without the outer frame is placed on a conveyor belt of a crushing machine. In step S13, a thickness of a glass of the solar panel on the conveyor belt is measured by a sensing unit. In step S14, a conveying speed of the conveyor belt is regulated according to the thickness of the glass. When the thickness of the glass is greater than a default value, the conveying speed of the conveyor belt is slowed down. When the thickness of the glass is less than the default value, the conveying speed of the conveyor belt is accelerated. Step S15 is conducting a crushing step for simultaneously regulating the conveying speed of the conveyor belt according to the thickness of the glass and crushing the glass of the solar panel for separating the glass from the solar panel. The following embodiment is described in detail based on FIG. 1.

Figure 2:
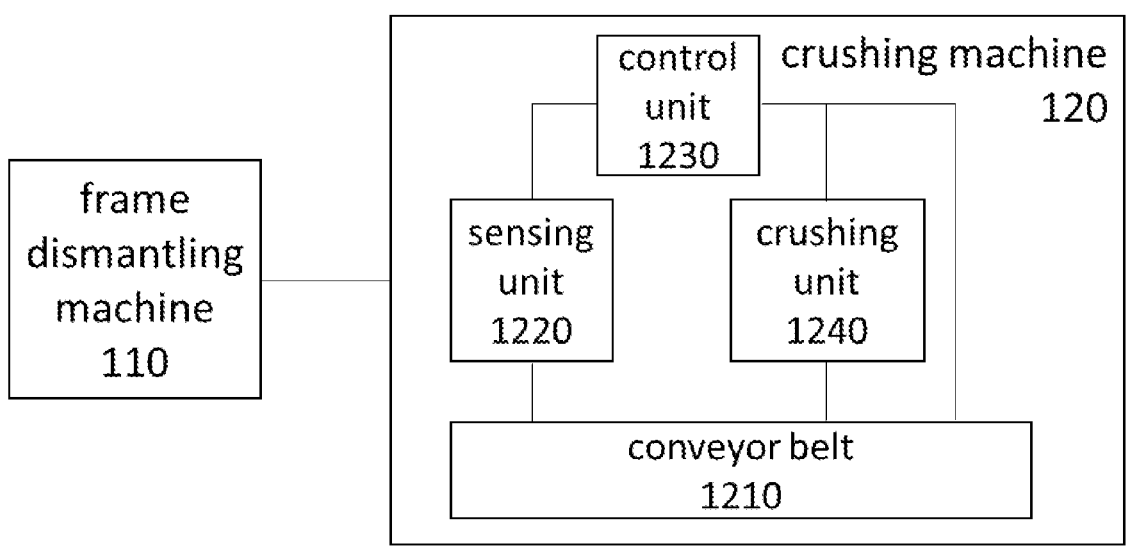
FIG. 2 is a block diagram illustrating an embodiment of a solar panel recycling system according to the technology disclosed present invention.

Next, please refer to FIG. 2, which is a block diagram showing an embodiment of the solar panel recycling system disclosed in the present invention. As shown in FIG. 2, a frame dismantling machine 110 is connected to a crushing machine 120, and the crushing machine 120 at least consists of a conveyor belt 1210, a sensing unit 1220, a control unit 1230, and a crushing unit 1240. The dismantling machine 110 is used to remove an outer frame of a solar panel. It should be noted that the solar panel mentioned in the present invention is recycled and its structure includes a glass and a solar battery module under the glass. However, the actual structure of the solar panel is not the main technical focus of the present invention and will not be elaborated here.

Next, the solar panel without the outer frame is placed on the conveyor belt 1210 of the crushing machine 120. Then the sensing unit 1220 of the crushing machine 120 measures a thickness of the glass of the solar panel, the control unit 1230 regulates a conveying speed of the conveyor belt 1210 according to the thickness and controls the crushing procedures to crush the glass of the solar panel to facilitate the producing of the crushed glass and solar cell module.

It should be noted that when the thickness of the glass of the solar panel measured by the sensing unit 1220 is greater than a default value, it means the glass of the solar panel is thicker and requires a longer crushing time. Accordingly, the control unit 1230 slows down the conveying speed of the conveyor belt 1210 on which the solar panel is placed and increases the staying time of the solar panel on the conveyor belt 1210. As the conveying speed of the conveyor 1210 is slowed down, and the longer crushing time in crushing unit 1240 is required, the glass of the solar panel can be completely crushed in this time range. On the other hand, when the thickness of the glass of the solar panel measured by the sensing unit 1220 is less than the default value, it means the glass is thinner and requires shorter crushing time. Accordingly, the control unit 1230 accelerates the conveying speed of the conveyor belt 1210 on which the solar panel is placed and reduces the staying time of the solar panel on the conveyor belt 1210. As the conveying speed of the conveyor belt 1210 is increased and the crushing time in the crushing unit 1240 is shortened, the glass of solar panel can be completely crushed within this time range. In this embodiment of the present invention, the types of sensing unit 1220 can be either a contact-type sensing unit or a non-contact type sensing unit, and the default value of the thickness of the glass of the solar panel is 6 mm.

In one embodiment of the present invention, the control unit 1230 comprises a frequency conversion controller for controlling the conveying speed of the conveyor belt 1210 by changing the output frequency. The output frequency setting range is 0-60 Hz. When the thickness of the glass measured by the sensing unit 1220 is less than 6 mm, such as 3 mm-6 mm, the control unit 1230 adjusts the frequency of the conveyor belt 1210 to 45 Hz-55 Hz according to the thickness range, thereby increasing the conveying speed of conveyor belt 1210. In another embodiment, when the thickness of the glass of the solar panel on the conveyor belt 1210 measured by the sensing unit 1220 is greater than 6 mm, such as 7 mm-15 mm, the control unit 1230 adjusts the frequency of the conveyor belt 1210 to 20 Hz-40 Hz, thereby reducing the conveying speed of the conveyor belt 1210.

Since the specifications of the solar panels vary from brand to brand, regulating the conveying speed of the conveyor belt 1210 according to the thickness of the glass of the solar panel can be used to solve the problem of existing technology in which no matter the thickness of the solar panel glass is greater less than the default value, the conveying speed of the conveyor belt of the crushing machine is the same, and it may result in the incomplete crushing of the glass, and one or more crushing procedures may be needed. Therefore, regulating the conveying speed of the conveyor 1210 can reduce the operation time and cost. Another advantage is that by controlling the conveying speed of the conveyor belt 1210, the solar panel can be completely broken and the adhesion between the glass and the solar cell module can be destroyed. Compared to conventional methods using heat to separate the glass of solar panel and the solar battery module, the present invention can effectively reduce energy consumption as well as pollution, and it can effectually separate the glass of solar panel from the solar cell module to facilitate subsequent recycling applications.

In an embodiment of the present invention, the crushing unit 1240 is made up of a plurality of unbreakable balls, that is steel balls, stainless steel balls, or zirconium balls, and these balls are used to hit and crush the glass of the solar panel. After the thickness of the glass is measured by the sensing unit 1220, the control unit 1230 controls the crushing procedures by adjusting the number of balls, the falling speed, or the frequency of ball hits.

Figure 3:
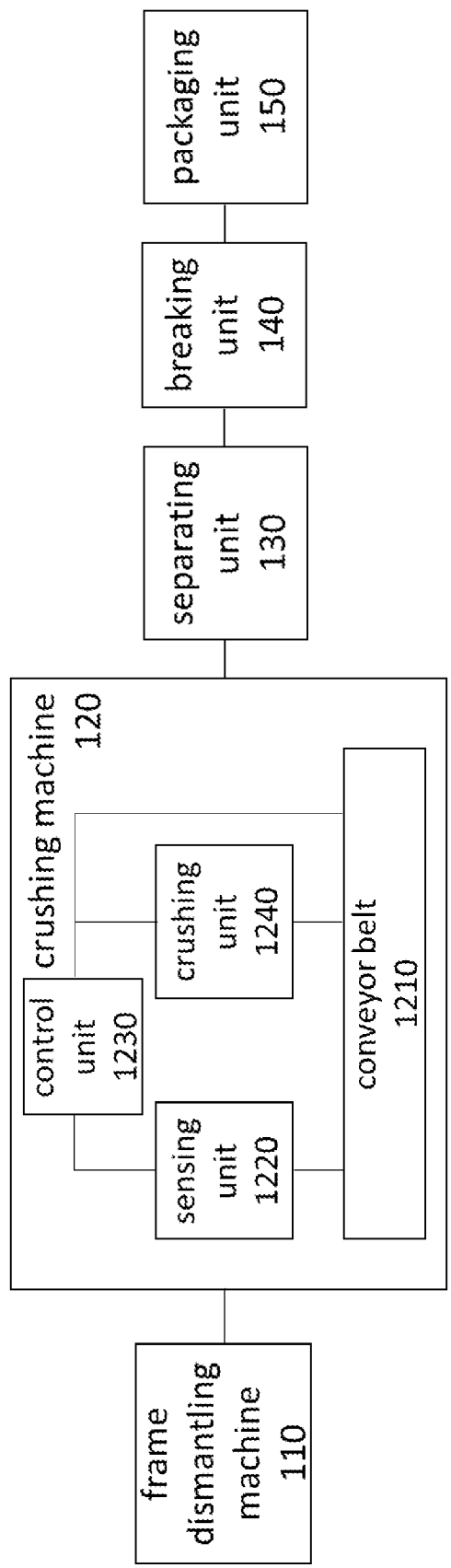
FIG. 3 is a block diagram illustrating another embodiment of a solar panel recycling system according to the technology disclosed to the present invention.

Next, please refer to FIG. 3, which is a block diagram of another embodiment of the solar panel recycling system disclosed in the present invention. FIG. 3 differs from FIG. 2 in that the solar panel recycling system in FIG. 3 further includes a separating unit 130, a breaking unit 140, and a packaging unit 150. The crushing machine 120 is located between the frame dismantling machine 110 and the separating unit 130, and the breaking unit 140 and the packaging unit 150 are placed behind the separating unit 130 in sequence. The frame dismantling machine 110 and the components and functions of the crushing machine 120 are as shown in FIG. 2 and will not be repeated here.

It should be noted that the separating unit 130 is used to separate the broken glass and crushing unit 1240 from the solar battery module of the solar panel. The procedures include transporting the glass of the solar panel crushed by the crushing machine 120 via conveyor belt 1210 to the separating unit 130, separating the crushed glass and the crushing unit 1240 from the solar battery module of the solar panel (no shown in the figure) by gravity, collecting the crushed glass and the crushing unit 1240 fallen into the recycling unit (now shown in the figure), the solar battery module of the solar panel is broken, cut, or chopped into 3-5 cm pieces by breaking unit 140, and then the broken, cut, chopped solar battery module of the solar panel is packaged by packaging unit 150 for further recycling treatments.

The foregoing descriptions are only preferred embodiments of the present invention and are not used to limit the scope of the present invention. Meanwhile, any person with ordinary knowledge in the art can easily understand and implement it. Therefore, any equivalent variation or modification without departing from the spirit of the present invention disclosed herein is to be included within the scope of the present invention.

What is claimed is:

1. A solar panel recycling system, comprising: a frame dismantling machine for removing an outer frame of a solar panel; and
   a crushing machine, wherein the solar panel without the outer frame is placed on a conveyor belt of the crushing machine comprising at least:
   a sensing unit for measuring a thickness of a glass of the solar panel; and
   a control unit for simultaneously regulating a conveying speed of the conveyor belt, when the thickness of the glass is greater than a default value, the control unit slows down the conveying speed of the conveyor belt, and when the thickness of the glass is less than the default value, the control unit accelerates the conveying speed of the conveyor belt, and the control unit controls a crushing unit for crushing the glass of the solar panel.

2. The solar panel recycling system according to claim 1, wherein the types of the sensing unit is either a contact-type sensing unit or a non-contact type sensing unit.

3. The solar panel recycling system according to claim 1, wherein the default value of the thickness of the glass is 6 mm.

4. The solar panel recycling system according to claim 1, wherein the crushing unit is steel balls, stainless steel balls, or zirconium balls.

5. The solar panel recycling system according to claim 1, further comprising a separating unit is provided for separating the glass of the solar panel from a solar battery module of the solar panel after the solar panel is crushed by the crushing unit.

6. The solar panel recycling system according to claim 5, further comprising a breaking unit is provided for breaking the solar battery module of the solar panel into 3-5 cm pieces after the glass is separated from the solar panel.

7. The solar panel recycling system according to claim 6, further comprising a packaging unit is provided for packaging the solar battery module of the solar panel after the solar panel is broken.

8. A solar panel recycling method, comprising:
   conducting a frame dismantling step for removing an outer frame of a solar panel;
   placing the solar panel without the outer frame on a conveyor belt of a crushing machine;
   measuring a thickness of a glass of the solar panel on the conveyor belt;
   regulating a conveying speed of the conveyor belt according to the thickness of the glass, when the thickness of the glass is greater than the default value, slowing down the conveying speed of the conveyor belt, and when the thickness of the glass is less than the default value, accelerating the conveying speed of the conveyor belt; and
   conducting a crushing step, simultaneously regulating the conveying speed of the conveyor belt according to the thickness of the glass and crushing the glass of the solar panel.

9. The solar panel recycling method according to claim 8, wherein the default value of the thickness of the glass is 6 mm.

* * * * *